United States Patent
Esposito (10) Patent No.: US 10,489,116 B1
(45) Date of Patent: Nov. 26, 2019

(54) PROGRAMMABLE INTEGRATED CIRCUITS WITH MULTIPLEXER AND REGISTER PIPELINING CIRCUITRY

(71) Applicant: Altera Corporation, San Jose, CA (US)

(72) Inventor: Benjamin Esposito, Oviedo, FL (US)

(73) Assignee: Altera Corporation, San Jose, CA (US)

( * ) Notice: Subject to any disclaimer, the term of this patent is extended or adjusted under 35 U.S.C. 154(b) by 961 days.

(21) Appl. No.: 14/326,828

(22) Filed: Jul. 9, 2014

(51) Int. Cl.
G06F 7/57 (2006.01)
G06F 15/78 (2006.01)

(52) U.S. Cl.
CPC .......... G06F 7/57 (2013.01); G06F 15/7867 (2013.01)

(58) Field of Classification Search
None
See application file for complete search history.

(56) References Cited

U.S. PATENT DOCUMENTS

| 5,522,085 | A | 5/1996 | Harrison et al. |
| 5,805,477 | A | 9/1998 | Perner |
| 5,935,197 | A | 8/1999 | Aldworth |
| 6,020,756 | A * | 2/2000 | New ............... H03K 19/17728 326/37 |
| 7,437,401 | B2 | 10/2008 | Zheng et al. |
| 8,521,800 | B1 | 8/2013 | Bergland et al. |
| 2003/0158880 | A1 * | 8/2003 | Ng .................... G06F 7/5338 708/628 |
| 2011/0231463 | A1 * | 9/2011 | Gunwani ............ H03K 19/177 708/232 |
| 2013/0346462 | A1 | 12/2013 | Bergland et al. |

* cited by examiner

*Primary Examiner* — John M Lindlof
(74) *Attorney, Agent, or Firm* — Treyz Law Group, P.C.; Jason Tsai (57) ABSTRACT

An integrated circuit may have specialized processing blocks that are configurable to operate as arithmetic operators that may implement amongst others multiplication, addition, sum-of-product, and multiply-accumulation operations in a first mode. In a second mode, the specialized processing blocks may operate as multiplexers and several specialized processing blocks may be cascaded to implement wider multiplexing functions. In a third mode, the specialized processing blocks may operate as register pipelines.

13 Claims, 10 Drawing Sheets

PROGRAMMABLE INTEGRATED CIRCUITS WITH MULTIPLEXER AND REGISTER PIPELINING CIRCUITRY

BACKGROUND

This invention relates to integrated circuits and, more particularly, to configurable specialized processing blocks in an integrated circuit.

Considering a programmable logic device (PLD) as one example of an integrated circuit, as applications for which PLDs are used increase in complexity, it has become more common to design PLDs to include configurable specialized blocks such as configurable specialized storage blocks and configurable specialized processing blocks in addition to blocks of generic programmable logic. Such specialized blocks may include circuitry that has been partly or fully hardwired to perform one or more specific tasks, such as a logical or a mathematical operation.

A specialized block may also contain one or more specialized structures. Examples of structures that are commonly implemented in such specialized blocks include multipliers, arithmetic logic units (ALUs), memory elements such as random-access memory (RAM) blocks, read-only memory (ROM) blocks, content-addressable memory (CAM) blocks and register files, AND/NAND/OR/NOR arrays, etc., or combinations thereof.

One particularly useful type of configurable specialized processing block that has been provided on programmable logic devices (PLDs) is a specialized processing block (SPB) that can be used to process audio signals (as an example). Such blocks may sometimes be referred to as multiply-accumulate (MAC) blocks, when they include structures to perform multiplication operations, summing operations, and/or accumulations of multiplication operations.

SUMMARY

In accordance with certain aspects of the invention, a circuit may have an output port, input ports, and configuration circuitry. The configuration circuitry may configure the circuit to perform an arithmetic function based on first, second, and third signals that were received at the input ports and to provide the result of the arithmetic function at the output port in a first mode. The configuration circuitry may further configure the circuit to perform a multiplexing function based on the first, second, and third signals and provide a selected one of the first, second, and third signals at the output port in a second mode.

It is appreciated that the present invention can be implemented in numerous ways, such as a process, an apparatus, a system, a device, or a method on a computer readable medium. Several inventive embodiments of the present invention are described below.

In certain embodiments, the above-mentioned configuration circuitry may configure the circuit to perform a register pipeline function of the first signal in a third mode. In this mode, the circuit may include at least one pipeline register between one of the input ports and the output port.

If desired, the circuit may further include two multipliers. The first multiplier may receive first and second signals from the input ports and perform a portion of the arithmetic function in the first mode and a portion of the multiplexing function in the second mode. The second multiplier may receive second and third signals from the input ports and perform an additional portion of the arithmetic function in the first mode and an additional portion of the multiplexing function in the second mode.

If desired, the circuit may further include an adder that is coupled to the first and second multipliers. The adder and the two multipliers may implement a sum of product function in the first mode and another portion of the multiplexing function in the second mode.

Further features of the invention, its nature and various advantages, will be more apparent from the accompanying drawings and the following detailed description of the preferred embodiments.

DETAILED DESCRIPTION

The present invention relates to integrated circuits and, more particularly, to integrated circuits with configurable specialized processing blocks.

Configurable specialized processing blocks are often configured to support a pure arithmetic use model in which input data is processed by arithmetic operators such as multipliers and adders or accumulators to implement an arithmetic function such as a multiply-accumulate function.

Typically, only a portion of a user design implements such arithmetic functions and this portion may vary depending on the design, whereas some integrated circuits may provide a fixed number of configurable specialized processing blocks. Thus, situations frequently arise where the implementation of a user design on an integrated circuit leaves some of the available configurable specialized processing blocks unused. Consequently, in an effort to use the available circuit area more efficiently, it would be desirable to implement other portions of the user design on these otherwise unused configurable specialized processing blocks.

For this purpose, a configurable specialized processing block may be configured to operate in different modes. For example, a configured specialized processing block may be configured as an arithmetic circuit, as a multiplexer, and/or as a register pipeline.

It will be recognized by one skilled in the art, that the present exemplary embodiments may be practiced without some or all of these specific details. In other instances, well-known operations have not been described in detail in order not to unnecessarily obscure the present embodiments.

Figure 1:
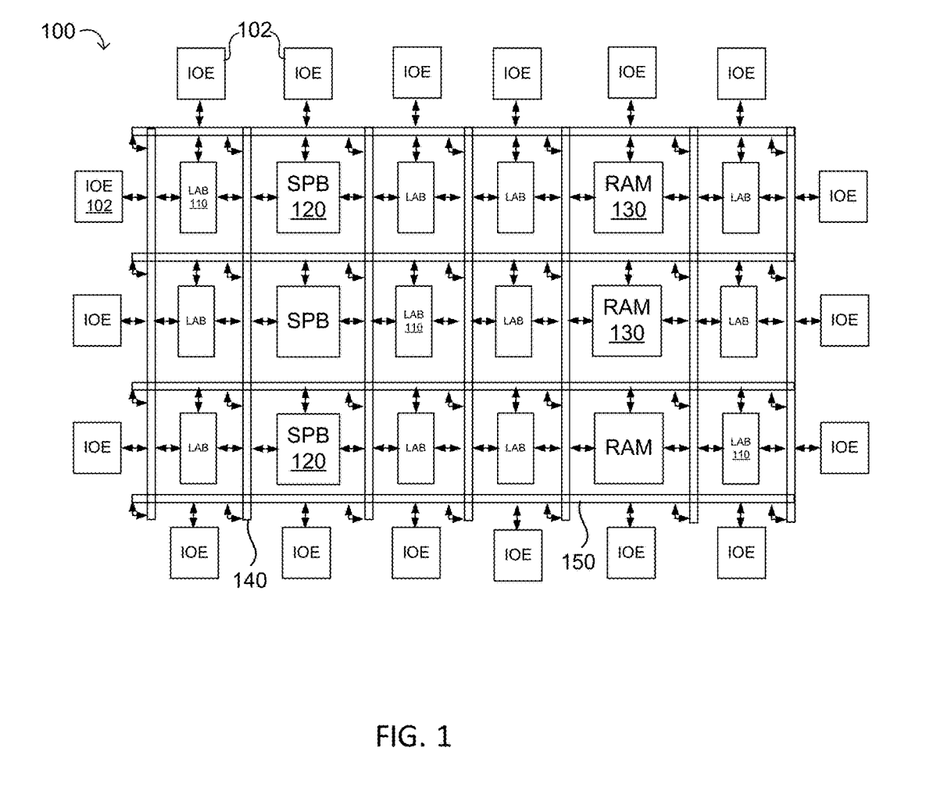
FIG. 1 is a diagram of an illustrative integrated circuit having specialized processing blocks in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and configurable specialized processing blocks such as specialized processing blocks (SPB) 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
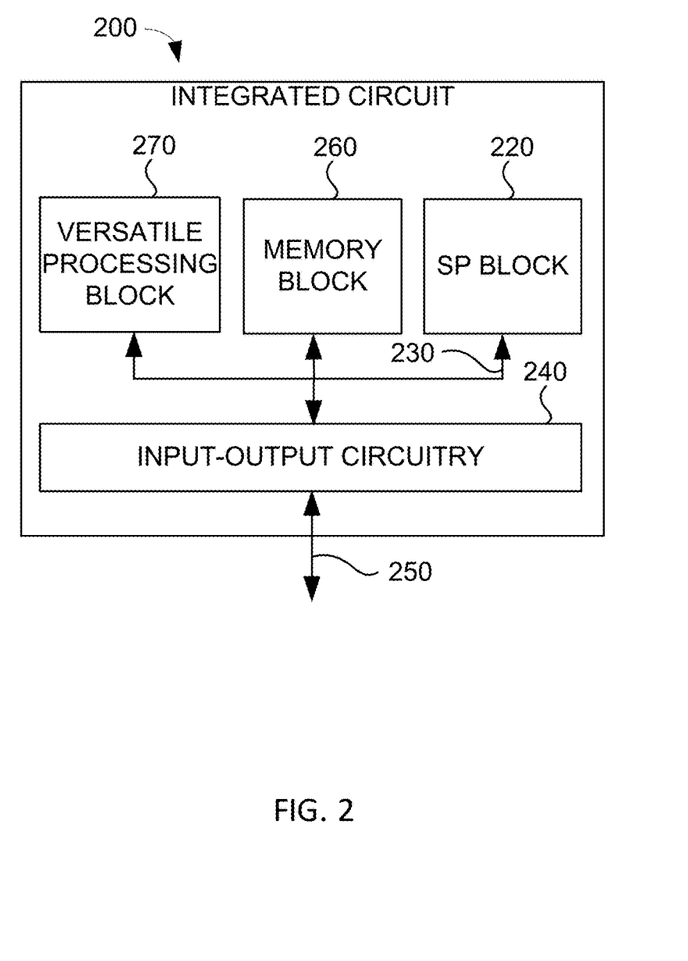
FIG. 2 is a diagram of an illustrative integrated circuit with storage, processing, and input-output circuitry in accordance with an embodiment.

FIG. 2 shows a block diagram of another embodiment of an integrated circuit 200 in accordance with the present invention. Integrated circuit 200 may include a memory block 260, a specialized processing (SP) block 220, a versatile processing block 270, and input/output circuitry 240.

SP block 220 may include multipliers, adders, accumulators, shifters, and other arithmetic circuitry. SP block 220 may also include storage elements such as registers, latches, memory arrays, or other storage circuitry. Such storage elements may serve different purposes. For instance, storage elements may store coefficients for implementing FIR filters or to select and mask input data when implementing a multiplexing function. Alternatively, storage elements may be used to pipeline a critical path or to synchronize data before it is processed. If desired, SP block 220 may be configurable to operate in different modes. For example, SP block 220 may be configurable to operate as an arithmetic circuit, as a multiplexer, and/or a register pipeline.

Memory block 260 may include random-access memory (RAM), first-in first-out (FIFO) circuitry, stack or last-in first-out (LIFO) circuitry, read-only memory (ROM), registers, latches, or other storage circuitry suitable to store data. Input/output circuitry may include parallel input/output circuitry, differential input/output circuitry, serial data transceiver circuitry, or other input/output circuitry suitable to transmit and receive data.

Versatile processing block 270 may include embedded microprocessors, microcontrollers, or other processing circuitry. Versatile processing block 270 may have combinational and sequential logic circuitry such as logical function blocks and storage elements such as registers. Versatile processing block 270 may be configurable or programmable to perform any arbitrary function. In comparison, SP block 220 may have limited functionality due to specialized processing components and limited configurability of interconnect resources. For example, SP block 220 may include multipliers and adders to facilitate the efficient implementation of arithmetic functions, but may not be configurable to implement combinational functions such as a combinational sum-of-products (i.e., a logical OR function of several logical AND functions). As another example, interconnect resources may be arranged such that SP block 220 can be configured to implement an arithmetic sum-of-products (i.e., an addition of several multiplications), but not an arithmetic product-of-sums (i.e., a multiplication of several additions).

In contrast, versatile processing block 270 may be configured to perform any function including arithmetic functions and combinational functions. However, versatile processing block 270 may be much less efficient in executing a function that SP block 220 can implement.

Internal interconnection resources 230 such as conductive lines and busses may be used to send data from one component to another component or to broadcast data from one component to one or more other components. External interconnection resources 250 such as conductive lines and busses, optical interconnect infrastructure, or wired and wireless networks with optional intermediate switches may be used to communicate with other devices. In certain embodiments, the internal interconnect resources 230, and/or the external interconnect resources 250 may be implemented using configurable interconnect circuitry.

Figure 3:
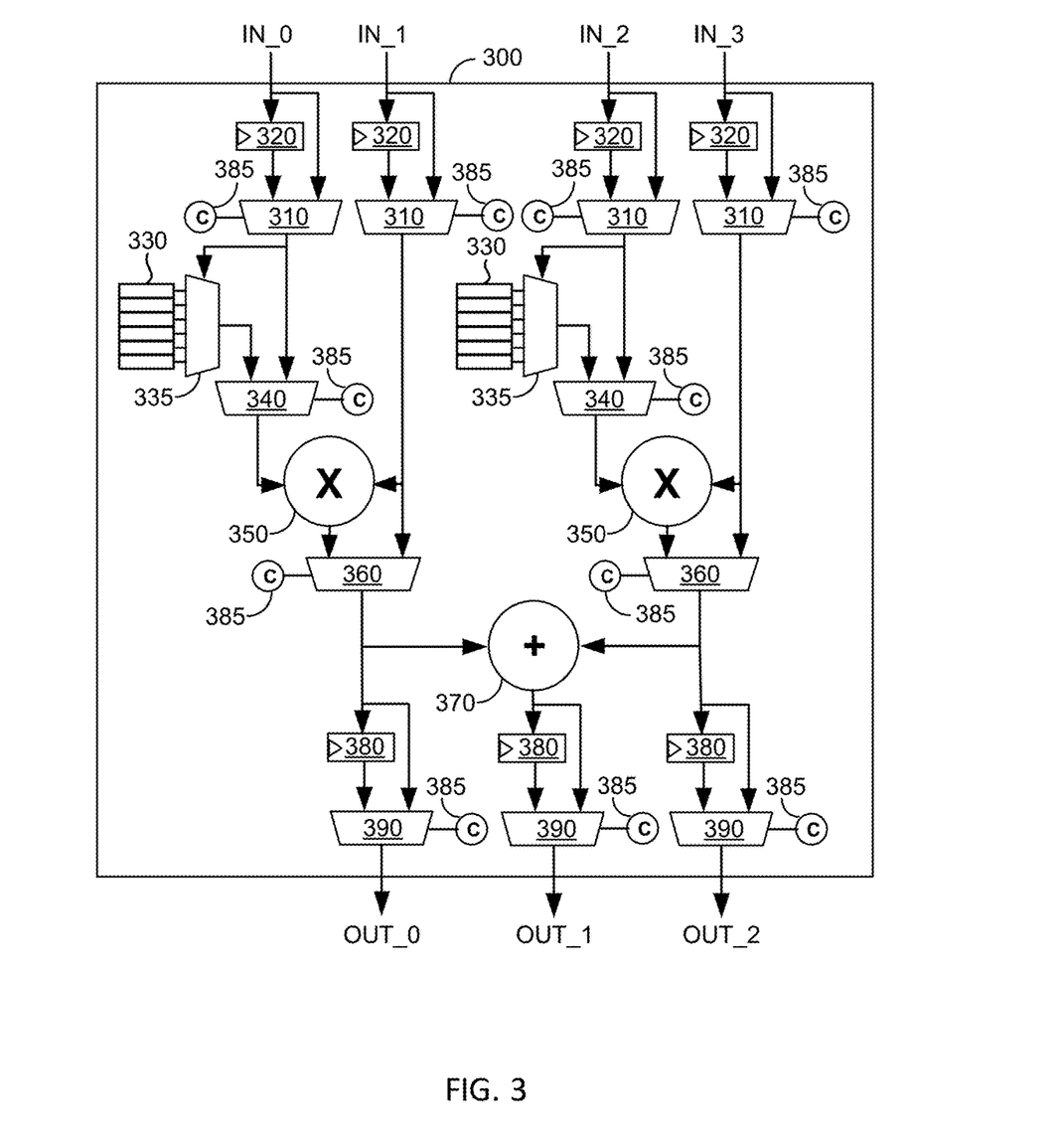
FIG. 3 is a diagram of an illustrative specialized processing block in accordance with an embodiment.

FIG. 3 shows an embodiment of a configurable specialized processing block such as SP block 220 of FIG. 2. Configurable specialized processing block 300 may include input registers 320 and output registers 380, multiplexers 310, 335, 340, 360, and 390, configuration memory 385, coefficient storage circuitry 330, multipliers 350, and adder 370.

Configurable specialized processing block 300 described in FIG. 3 is merely illustrative and is not intended to limit the scope of the present invention. If desired, some multiplexers may be omitted to trade-off flexibility for circuit area. For example, omitting multiplexers 310 may reduce the area of configurable specialized processing block 300 by four 2:1 multiplexers and the respective configuration bits and wires at the expense that all input data is registered, thereby adding one clock cycle of latency to all incoming data. Similarly, omitting multiplexers 390 may reduce the area of configurable specialized processing block 300 by three 2:1 multiplexers and the respective configuration bits and wires at the expense that all output data is registered, thereby adding one clock cycle of latency all outgoing data.

If desired, configurable specialized processing block 300 may include additional circuitry. For example, configurable specialized processing block 300 may include additional circuitry for pattern detection, rounding, saturation, overflow and underflow handling, and/or additional arithmetic circuitry such as accumulator circuitry (e.g., circuitry implemented as a feedback loop from an output register 380 to adder 370) or pre-adder circuitry (e.g., to add input signals in symmetrical filter implementations), just to name a few. Arithmetic circuitry may perform integer arithmetic, fixed-point arithmetic, and/or floating-point arithmetic (e.g., single-precision floating-point, double-precision floating-point, etc.) operations.

If desired, configurable specialized processing block 300 may have more or less inputs and outputs. For example, configurable specialized processing block 300 may have only a single output and six inputs. In this example, the single output may be driven by a multiplexer that may choose between an adder output and a multiplier output (not shown).

Every signal in configurable specialized processing block 300 may include multiple bits of data. For example, input signals IN_0, IN_1, IN_2, and IN_3 may all include nine bits, 12 bits, 16 bits, 18 bits, 25 bits, 27 bits, 32 bits, 36 bits, etc. If desired, each pair of signals (i.e., IN_0 and IN_1, or IN_2 and IN_3) may have a different number of bits. For example, IN_0 and IN_2 may have 18 bits while IN_1 and IN_3 have 25 bits. As another example, IN_0 and IN_2 may have 27 bits while IN_1 and IN_3 have 18 bits or vice versa. These examples are merely illustrative.

Similarly, output signals OUT_0, OUT_1, and OUT_2 may all have the same number of bits. Alternatively, all output signals may have a different bit width. As an example, OUT_1 may have one more bit than OUT_0 and OUT_1. For example, the multiplication of two 18-bit numbers in each of multipliers 350 may produce two 36-bit numbers. Adding these two 36-bit numbers in adder 370 may produce a 37-bit number because of a potential carry bit.

Configurable specialized processing block 300 may have a different number of multipliers 350 and/or adders 370 than shown in FIG. 3. For example, configurable specialized processing block 300 may include four multipliers 350 and three adders 370, thereby allowing for four independent multiplications, two independent sum of two products, or a sum of four products.

Multipliers 350 may be any type of multiplier. For example, multiplier 350 may be a floating-point multiplier, a fixed-point multiplier, an integer multiplier, just to name a few. Similarly, adder 370 may be any type of adder. For example, adder 370 may be a floating-point adder, a fixed-point adder, an integer adder, just to name a few.

If desired, configurable specialized processing block 300 may have a feedback path (not shown) from the output register 380 that is driven by adder 370 back to the input of adder 370 to allow for the implementation of a multiply-accumulate function.

Configuration circuitry such as configuration memory 385 may control the selection in multiplexers 310, 340, 360, and 390 and thereby configure configurable specialized processing block to operate in different modes. For example, configurable specialized processing block 300 may be configured to operate as an arithmetic operator, as a multiplexer, as a register pipeline, or in some combinations thereof such as a register pipelined multiplexer, a register pipelined arithmetic operator, or a multiplexer with arithmetic operation execution.

As an example, configuration circuitry may configure multiplexers 310 and 360 to serve as bypass circuitry, which routes inputs IN_1 and IN_3 to adder 370, thereby bypassing multipliers 350.

When configured to operate as an arithmetic operator, configurable specialized processing block 300 may implement two independent multiplications, an addition, a sum of products, and some combinations thereof, just to name a few. For example, configurable specialized processing block 300 may compute the product of signals IN_0 and IN_1 and the product of the signals IN_2 and IN_3 by selecting the respective signals in multiplexers 310, selecting the output of multiplexers 310 in multiplexers 340, multiplying each pair of signals in multipliers 350, selecting the output of multipliers 350 in multiplexers 360, and selecting the output of multiplexers 360 in multiplexers 390 to produce signals OUT_0 and OUT_2, respectively.

If desired, multiplexers 310 and 390 may be configured to store input signals IN_0, IN_1, IN_2, and IN_3 in input registers 320 and the results of the multiplication in output registers 380. Adder 370 may compute the sum of the outputs of multiplexers 360, thereby producing a sum of products as output signal OUT_1.

When configured to operate as a multiplexer, signals IN_0 and IN_2 may be used as select signals and select between signals IN_1 and IN_3. For example, configurable specialized processing block 300 may select signal IN_1 by directing multiplexers 335 with signals IN_0 and IN_2 to select a one and a zero in coefficient storage 330, respectively. Multiplexers 340 may select the output of multiplexers 340. Multiplying IN_1 with one produces IN_1 and IN_3 with zero produces IN_1 and zero at the output of multipliers 350, respectively. Selecting the output of multipliers 350 in multiplexers 360 and computing the sum in adder 370 may produce IN_1 as output signal OUT_1.

Figure 4:
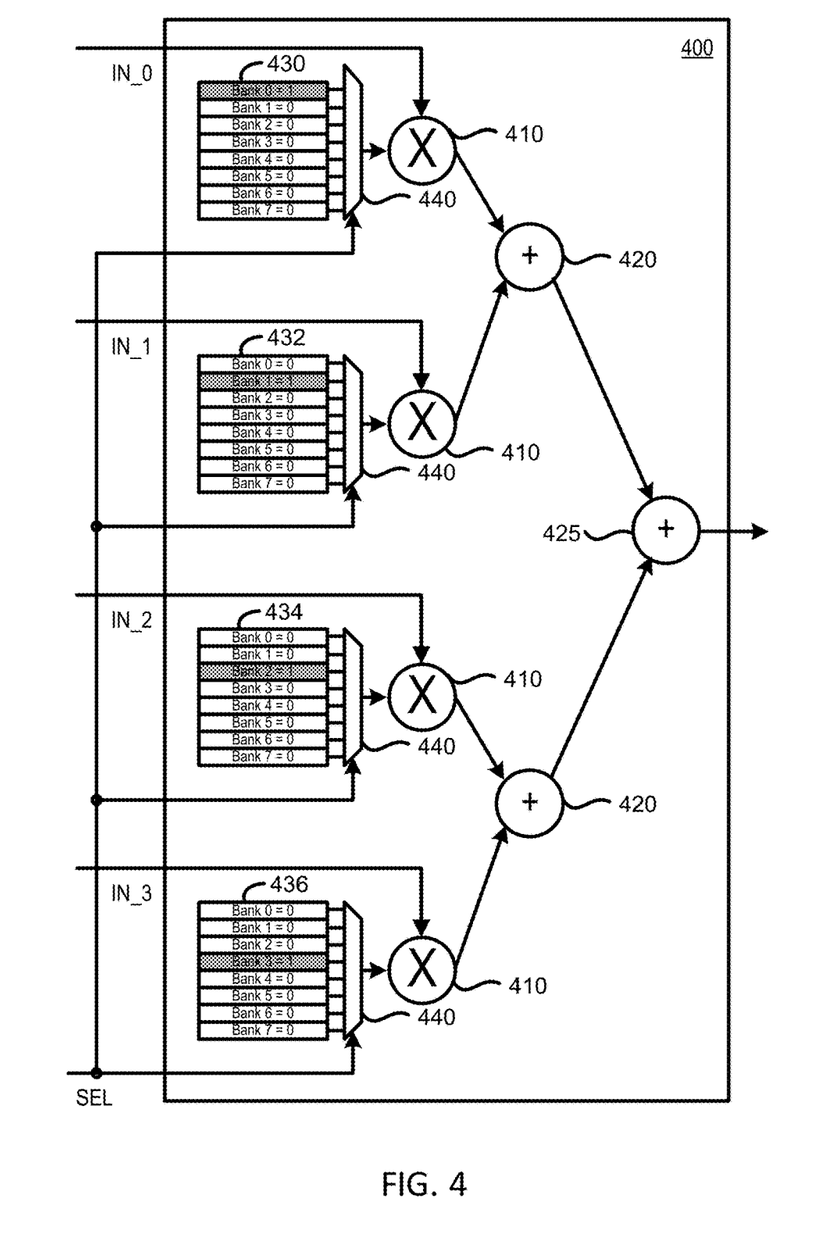
FIG. 4 is a diagram of an illustrative specialized processing block that is configured to operate as a 4:1 multiplexer in accordance with an embodiment.

FIG. 4 shows an embodiment of a configurable specialized processing block 400 that is configured to operate as a 4:1 multiplexer. As shown, configurable specialized processing block 400 may include coefficient storage blocks 430, 432, 434, and 436, multiplexers 440, multipliers 410, first stage adders 420, and second stage adder 425. Configurable specialized processing block 400 may include additional circuitry, which has been omitted in order not to unnecessarily obscure the present embodiment.

As an example, coefficient storage blocks 430, 432, 434, and 436 may each be configured to store a '1' at a first, second, third, and fourth address, respectively, and to store zeroes at the second, third, and fourth addresses, at the first, third, and fourth addresses, at the first, second, fourth addresses, and at the first, second, and third addresses, respectively.

For example, coefficient storage block 430 may store a '1' at address Bank 0, while coefficient storage blocks 432, 434, and 436 store a '0' at address Bank 0. Similarly, coefficient storage blocks 432, 434, and 434 may store a '1' at addresses Bank 1, Bank 2, and Bank 3, respectively, while coefficient storage blocks 430, 434, and 436 store a '0' at address Bank 1, coefficient storage blocks 430, 432, and 436 store a '0' at address Bank 2, and coefficient storage blocks 430, 432, and 434 store a '0' at address Bank 3.

Configurable specialized processing block 400 may receive input signals IN_0, IN_1, IN_2, IN_3, and select signal SEL. Select signal SEL may control multiplexers 440 to select a coefficient from coefficient storage 430, 432, 434, and 436 and thereby control which input signal may be selected. For example, select signal SEL may be '0', which may direct multiplexers 440 to select the coefficients stored at address Bank 0 in coefficient storage blocks 430, 432, 434, and 436. Thus, multiplexers 440 may select '1', '0', '0', and '0' from coefficient storage blocks 430, 432, 434, and 436, respectively. Multipliers 440 may compute products as IN_0, '0', '0', and '0', respectively, which adders 420 and 425 may sum together resulting in IN_0 being produced at the output of adder 425.

Similarly, select signal SEL may be '1', '2', or '3', which may direct multiplexers 440 to select the coefficients stored at addresses Bank 1, Bank 2, and Bank 3, respectively, in coefficient storage blocks 430, 432, 434, and 436, thereby producing IN_1, IN_2, and IN_3, respectively, at output of adder 425.

Figure 5:
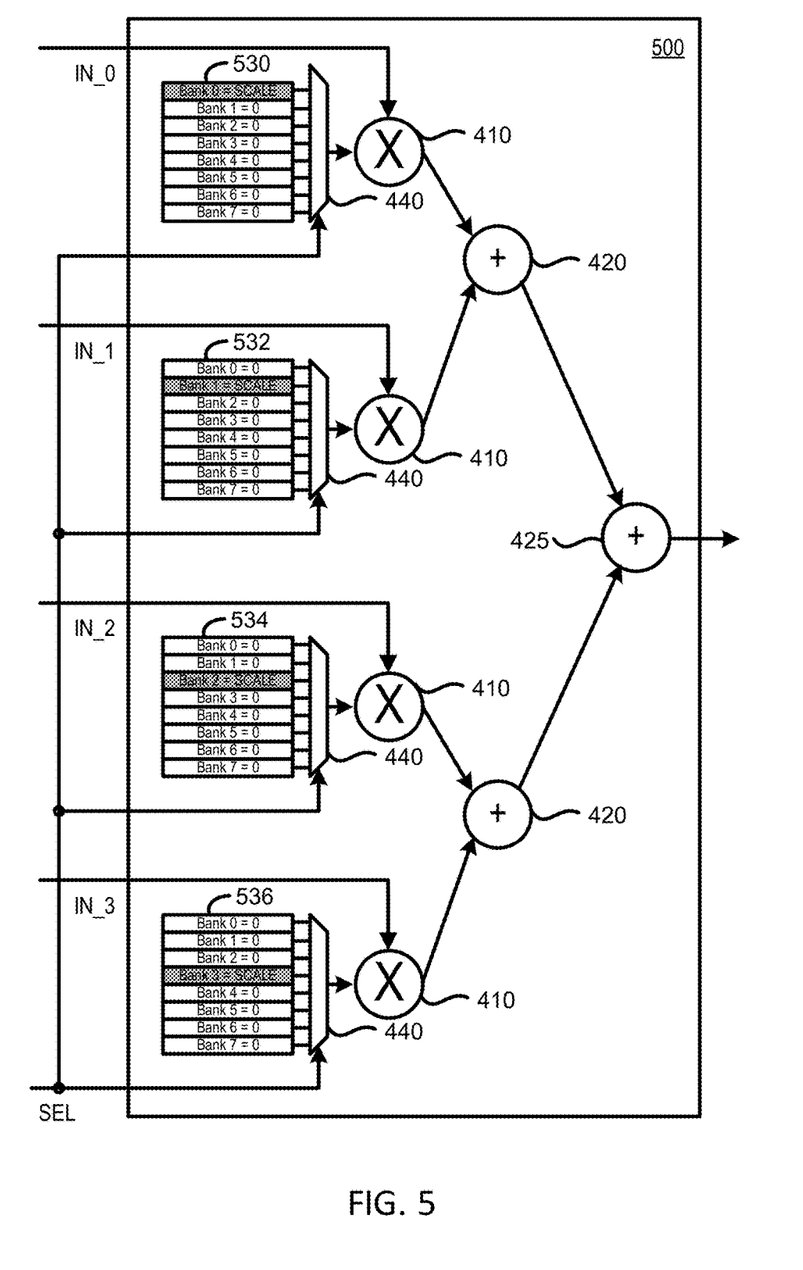
FIG. 5 is a diagram of an illustrative specialized processing block that is configured to operate as a 4:1 multiplexer with a scaling factor in accordance with an embodiment.

In some applications, it may be desirable to multiply the selected input signal with a constant scaling factor (e.g., if the selected input signal is multiplied with a constant number in a later operation). FIG. 5 shows an embodiment of a configurable specialized processing block that is configured to operate as a 4:1 multiplexer in which the selected input signal is multiplied with constant scaling factor SCALE.

As shown, configurable specialized processing block 500 may include coefficient storage blocks 530, 532, 534, and 536, multiplexers 440, multipliers 410, first stage adders 420, and second stage adders 425. Configurable specialized processing block 500 may include additional circuitry, which has been omitted in order not to unnecessarily obscure the present embodiment.

As an example, coefficient storage blocks 530, 532, 534, and 536 may each be configured to store a scaling factor SCALE (e.g., a factor which may be equal to 2, 4, 5, 8, 10, 2.5, etc.) at a first, second, third, and fourth address, respectively, and to store zeroes at the second, third, and fourth addresses, at the first, third, and fourth addresses, at the first, second, and fourth addresses, and at the first, second, and third addresses, respectively. For example, coefficient storage block 530 may store a scaling factor SCALE at address Bank 0, while coefficient storage blocks 532, 534, and 536 store a '0' at address Bank 0. Similarly, coefficient storage blocks 532, 534, and 534 may store a scaling factor SCALE at addresses Bank 1, Bank 2, and Bank 3, respectively, while coefficient storage blocks 530, 534, and 536 store a '0' at address Bank 1, coefficient storage blocks 530, 532, and 536 store a '0' at address Bank 2, and coefficient storage blocks 530, 532, and 534 store a '0' at address Bank 3.

Configurable specialized processing block 500 may receive input signals IN_0, IN_1, IN_2, IN_3, and select signal SEL. Select signal SEL may control multiplexers 440 to select a coefficient from coefficient storage 530, 532, 534, and 536 and thereby control which input signal may be selected and multiplied with scaling factor SCALE. For example, select signal SEL may be '0', which may direct multiplexers 440 to select the coefficients stored at address Bank 0 in coefficient storage blocks 530, 532, 534, and 536. Thus, multiplexers 440 may select scaling factor SCALE, '0', '0', and '0' from coefficient storage blocks 530, 532, 534, and 536, respectively. Multipliers 440 may compute products as (SCALE*IN_0), '0', '0', and '0', respectively, which adders 420 and 425 may sum together resulting in (SCALE*IN_0) being produced at the output of adder 425.

Similarly, select signal SEL may be '1', '2', or '3', which may direct multiplexers 440 to select the coefficients stored at addresses Bank 1, Bank 2, and Bank 3, respectively in coefficient storage blocks 530, 532, 534, and 536, thereby producing (SCALE*IN_1), (SCALE*IN_2), and (SCALE*IN_3), respectively at output of adder 425.

If desired, larger multiplexers may be formed by cascading smaller multiplexers. As an example, a 16:1 multiplexer may be formed by two stages of 4:1 multiplexers in which the first stage includes four 4:1 multiplexers and the second stage includes one 4:1 multiplexer. An embodiment of such an arrangement that uses configurable specialized processing block 400 of FIG. 4 to implement each of the 4:1 multiplexers is shown in FIG. 6.

Figure 6:
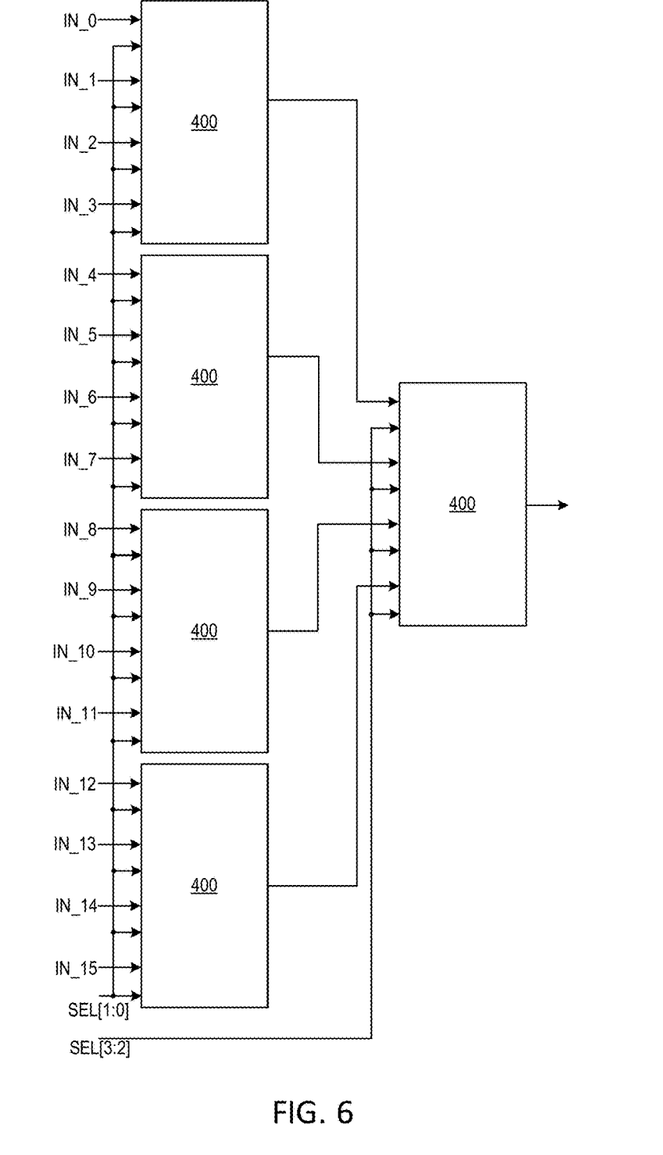
FIG. 6 is a diagram of five illustrative specialized processing blocks that are arranged and configured to operate as a 16:1 multiplexer in accordance with an embodiment.

As shown, the 16:1 multiplexer of FIG. 6 includes a first stage of four configurable specialized processing blocks 400 and a second stage of one configurable specialized processing block 400 that are each configured to operate as 4:1 multiplexers as shown in FIG. 4 and described above. Each of the four configurable specialized processing blocks 400 receives four input signals and a select signal, whereby the select signal is shared among all four configurable specialized processing blocks 400. For example, the top-most configurable specialized processing block 400 may receive input signals IN_0, IN_1, IN_2, IN_3 and select signal SEL[1:0], the next configurable specialized processing block 400 may receive input signals IN_4, IN_5, IN_6, IN_7, and select signal SEL[1:0], etc.

The select signal together with the coefficients that are stored in the coefficient storage may select one signal from each of the configurable specialized processing blocks 400. As an example, the select signal together with the coefficients stored in the coefficient storage may select input signals IN_0, IN_4, IN_8, and IN_12, respectively.

The configurable specialized processing block 400 that forms the second stage of the 16:1 multiplexer may receive select signal SEL[3:2] and the selected input signals from the first stage. Select signal SEL[3:2] together with the coefficients that are stored in the coefficient storage may select one signal from the signals received from configurable specialized processing blocks 400 of the first stage. As an example, configurable storage block 400 may receive signals IN_0, IN_4, IN_8, and IN_12 from the first stage, and the select signal SEL[3:2] together with the coefficients stored in the coefficient storage may select signal IN_0 as the output signal of the 16:1 multiplexer.

If desired, some of the 4:1 multiplexers may be implemented using different circuitry. For example, 4:1 multiplexers may be implemented as dedicated circuitry, using functional blocks (e.g., using LABs 110 of FIG. 1), or using the embodiment of configurable specialized processing block 500 of FIG. 5, thereby multiplying the selected input signal with a scaling factor, just to name a few alternative implementations.

If desired, a configurable specialized processing block such as configurable specialized processing blocks 300, 400, or 500 may be configured to implement registered multiplexers or registered arithmetic operators (e.g., using input registers 320 and/or output registers 380 of FIG. 3). In certain embodiments, a configurable specialized processing block such as configurable specialized processing block 300 may be configured to operate as a register pipeline.

In the example of configurable specialized processing block 300, configuration bits may configure multiplexers 310, 360, and 390 such that input signals IN_1 and/or IN_3 are register pipelined. Consider the scenario in which configurable specialized processing block 300 is configured to implement two register pipeline stages for signals IN_1 and IN_3. In this scenario, input registers 320 may operate as a first register pipeline stage and store input signals IN_1 and IN_3.

Multiplexer 310 may select the stored signals from input registers 320, multiplexers 360 may select the signals from multiplexers 310, and output registers 380 may operate as a second register pipeline stage and store the signals from multiplexers 360. Multiplexers 390 may select the stored signals from output registers 380, and thereby provide the signals as output signals OUT_0 and OUT_2.

Figure 7:
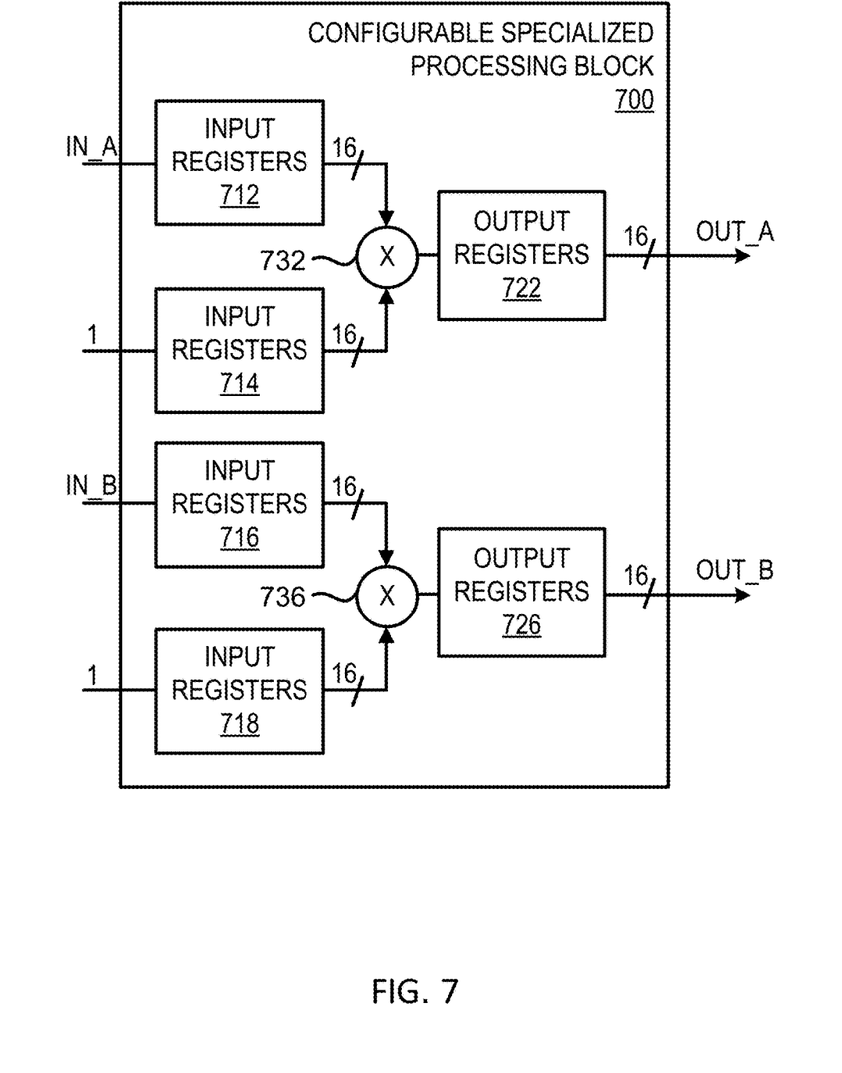
FIG. 7 is a diagram of an illustrative specialized processing block that is configured to operate as a two independent 16-bit pipeline registers in accordance with an embodiment.

Configurable specialized processing block 300 may be configured differently and still operate as a register pipeline. An embodiment of such a configurable specialized processing block is shown in FIG. 7. As an example, configurable specialized processing block 300 of FIG. 3 may be configured as shown in FIG. 7 if multiplexers 360 were omitted.

Configurable specialized processing block 700 may include input registers 712, 714, 716, and 718, multipliers 732 and 736, and output registers 722 and 726. As shown, configurable specialized processing block 700 may be configured to operate as two independent, two stage register pipelines with each having 16 bits of data. Configurable specialized processing block 700 may receive input signals IN A, IN B and '1' at the two remaining input ports. Input registers 712 and 716 may store input signals IN A and IN B, respectively, while input registers 714 and 718 may store '1'.

Multiplier 732 may multiply IN A that is stored in input registers 712 with '1' stored in input registers 714, thereby producing IN A, which may be stored in output registers 722. Similarly, multiplier 736 may multiply IN B that is stored in input registers 716 with '1' stored in input registers 718, thereby producing IN B, which may be stored in output registers 726.

Instead of receiving a '1' at input ports, configurable specialized processing block 700 may receive a select signal that may direct a multiplexer to retrieve a '1' stored in coefficient storage circuitry such as coefficient storage circuitry 330 of FIG. 3.

Figure 8:
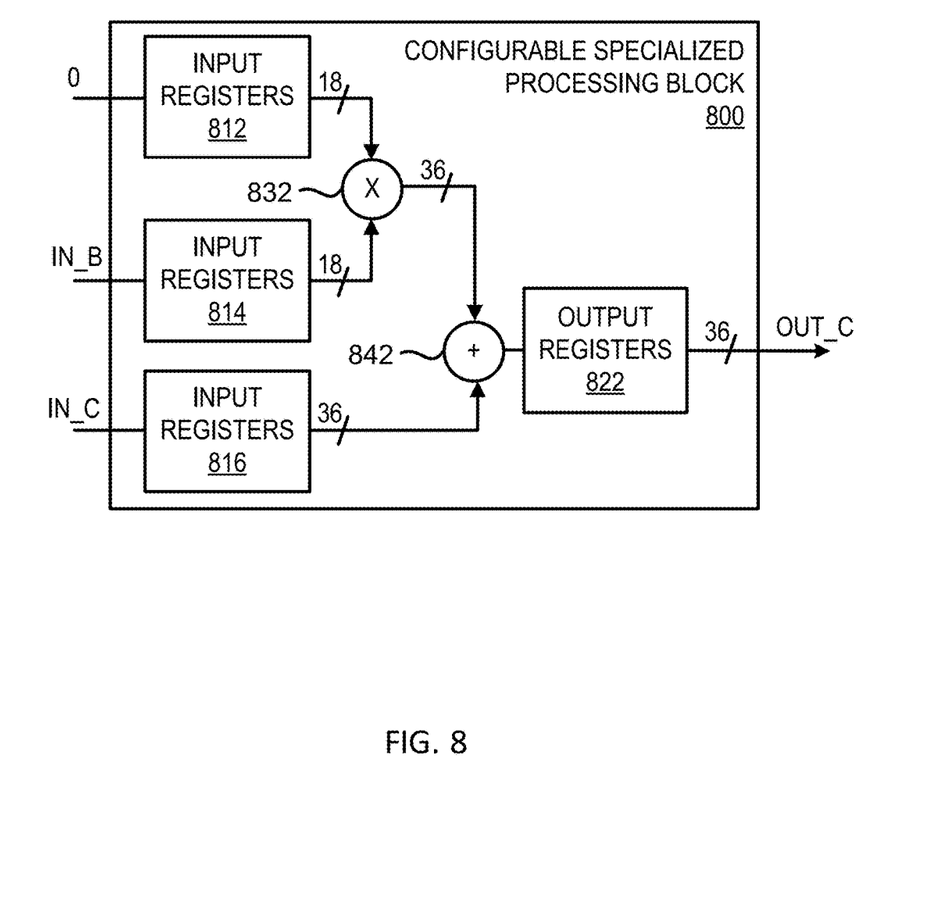
FIG. 8 is a diagram of an illustrative specialized processing block that is configured to operate as a 36-bit pipeline register in accordance with an embodiment.

Another embodiment of a configurable specialized processing block that is configured to operate as a register pipeline is shown in FIG. 8. Configurable specialized processing block 800 may include input registers 812, 814, and 816, multiplier 832, adder 842, and output registers 822. As shown, configurable specialized processing block 800 may be configured to operate as a two stage register pipelines having 36 bits of data.

Configurable specialized processing block 800 may receive input signals IN B, IN C and '0' at the input ports. Input registers 814 and 816 may store input signals IN B and IN C, respectively, while input registers 812 may store '0'.

Multiplier 832 may multiply IN B that is stored in input registers 814 with '0' stored in input registers 812, thereby producing '0'. Adder 842 may add IN C that is stored in input registers 816 to '0' from multiplier 832, thereby producing IN C, which may be stored in output registers 822.

If desired, configurable specialized processing block 800 may include coefficient storage circuitry coupled to a multiplexer, such as coefficient storage circuitry 330 that is coupled to multiplexer 335 of FIG. 3, and an input signal (e.g., signal IN A, not shown) may direct the multiplexer to retrieve a '0' stored in the coefficient storage circuitry.

Figure 9:
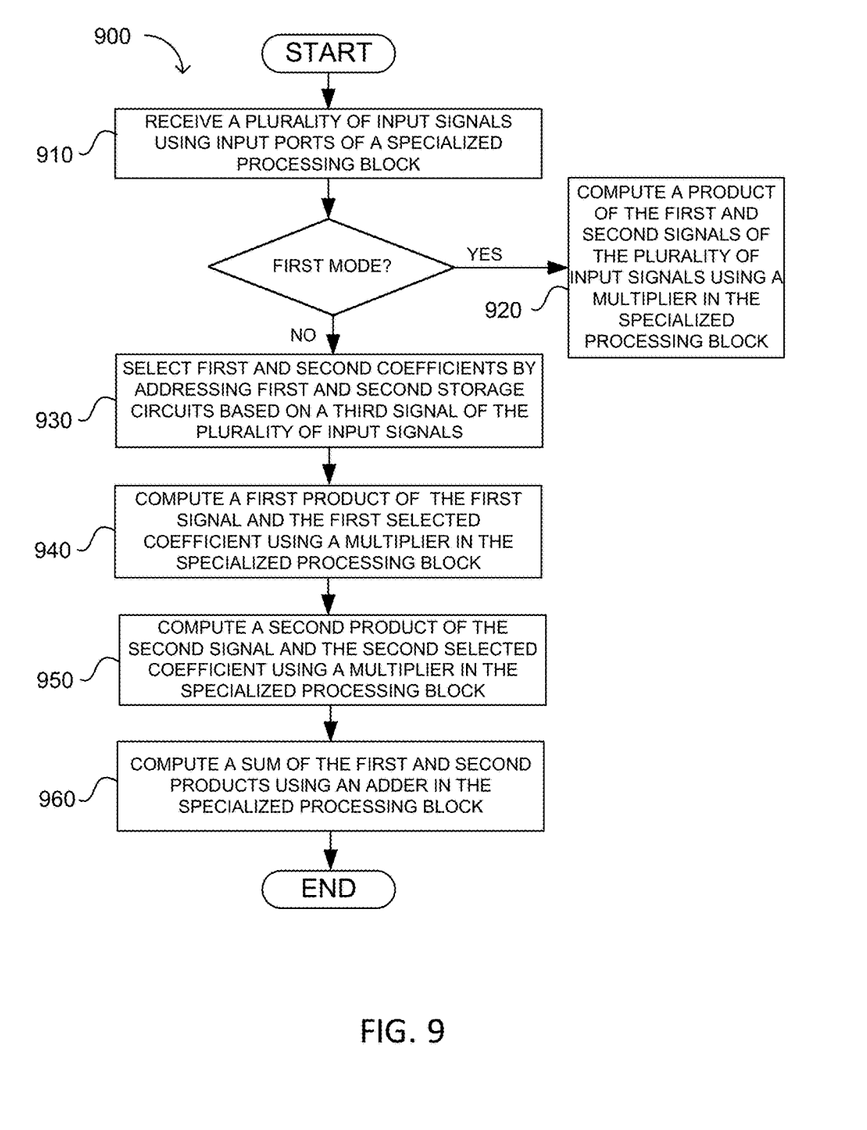
FIG. 9 is a flow chart showing illustrative steps for operating a specialized processing block as an arithmetic circuit in a first mode and as a multiplexer in a second mode in accordance with an embodiment.

FIG. 9 is a flow chart showing illustrative steps for operating a configurable specialized processing block such as configurable specialized processing block 300 of FIG. 3 as an arithmetic circuit in a first mode and as a multiplexer in a second mode in accordance with an embodiment.

During step 910, the configurable specialized processing block may receive first, second and third signals. Depending on whether the configurable specialized processing block is configured to operate in a first or second mode, the configurable specialized processing block may operate as an arithmetic operator or as a multiplexer, respectively.

In response to determining that the configurable specialized processing block is configured to operate in first mode, the configurable specialized processing block may compute a product of the first and second signals during step 920.

In response to determining that the configurable specialized processing block is not configured to operate in first mode, the configurable specialized processing block may select first and second coefficients by addressing first and second storage circuits based on the third signal during step 930. For example, the third input may direct a multiplexer such as multiplexer 335 of FIG. 3 to select an appropriate coefficient from a coefficient storage circuitry such as coefficient storage circuitry 330 of FIG. 3.

During step 940, the configurable specialized processing block may compute a first product of the first signal and the first selected coefficient and a second product of the second signal and the second selected coefficient during step 950. In the event that one of the first and second selected coefficients is '1' and the other is '0', one of the first and second products may be '0' while the other may be the first or second signal.

During step 960, the configurable specialized processing block may compute a sum of the first and second products. In the event that one of the first and second products is '0' and the other the first or second signal, the output of the adder may produce either the first or the second signal at an output of the configurable specialized processing block, thereby selecting between the first and second signals based on the third signal.

Figure 10:
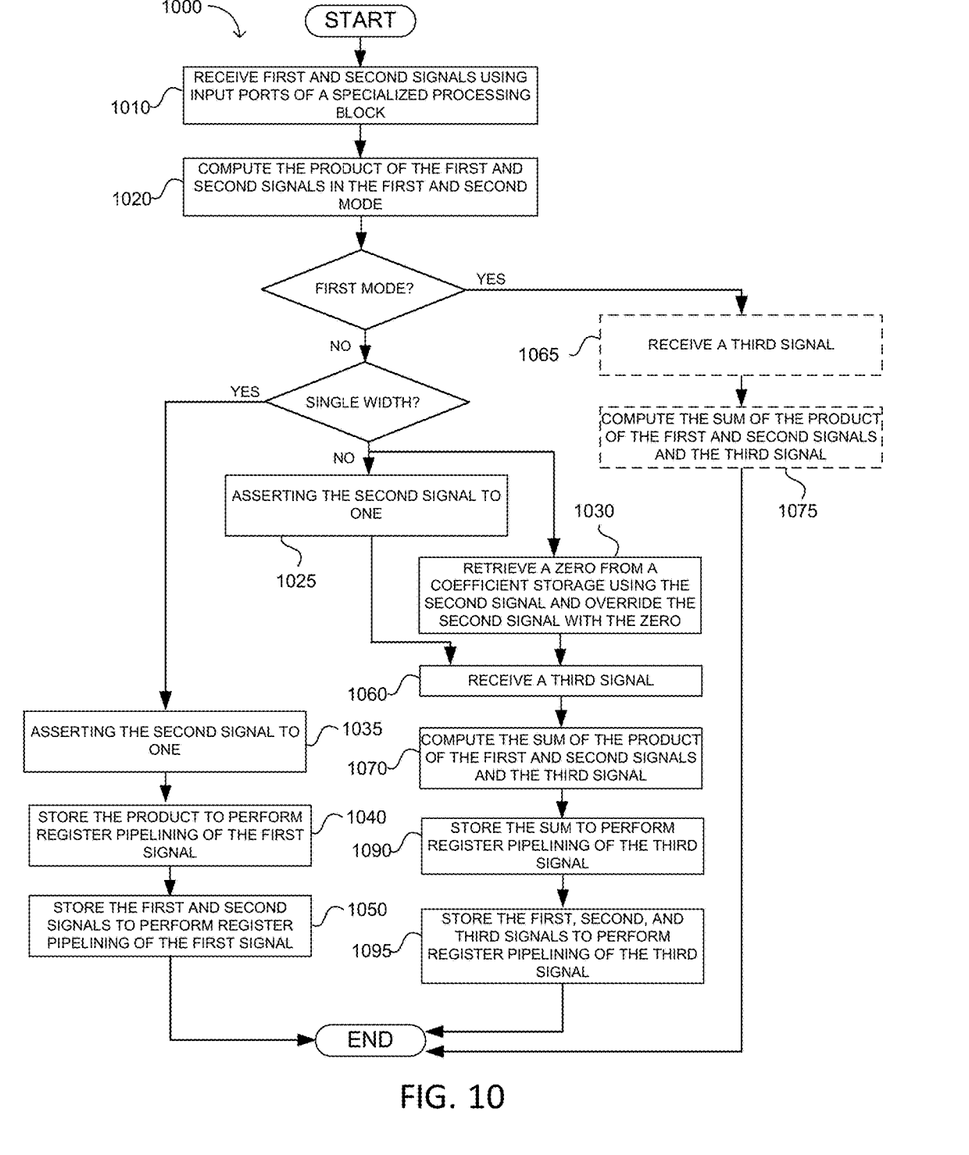
FIG. 10 is a flow chart showing illustrative steps for operating a specialized processing block as an arithmetic circuit in a first mode and as pipeline registers in a second mode in accordance with an embodiment.

FIG. 10 is a flow chart showing illustrative steps for operating a configurable specialized processing block such as configurable specialized processing block 300 of FIG. 3 as a single register pipeline in a first mode and as one and two pipeline registers in a second mode in accordance with an embodiment.

During step 1010, the configurable specialized processing block may receive first and second signals. During step 1020, the configurable specialized processing block may compute the product of the first and second signals in the first and second mode.

In the event that the configurable specialized processing block is configured to operate in a first mode which may include executing an arithmetic function, the configurable specialized processing block may optionally receive a third signal during step 1065 and compute the sum of the product of the first and second signals and the third signal during step 1075.

In the event that the configurable specialized processing block is not configured to operate in a first mode, the configurable specialized processing block may be configured to operate in a second mode which may include register pipelining a signal. Register pipelining may be performed in single width mode as shown in FIG. 7 or in double width mode as shown in FIG. 8.

In response to determining that the configurable specialized processing block operates in single with mode, the configurable specialized processing block may receive a second signal that is asserted to '1' during step 1035, which has the effect that the product of the first and second signals computed during step 1020 is the first signal. The configurable specialized processing block may store the product to perform register pipelining of the first signal (e.g., using output registers 722 of FIG. 7) during step 1040. In order to implement a second register pipeline stage, the configurable specialized processing block may store the first and second signals to perform register pipelining of the first signal (e.g., using input registers 712 and 714 of FIG. 7) during step 1050.

In response to determining that the configurable specialized processing block operates not in single width mode, the configurable specialized processing block may receive a second signal that is asserted to '0' during step 1025. Alternatively, the second signal may serve as a control signal that retrieves '0' from coefficient storage and overrides the second signal during step 1030 for the purpose of computing the product of first and second signals during step 1020, which as a result is '0'.

During step 1060, the configurable specialized processing block may receive a third signal and compute the sum of the product of the first and second signals and the third signal (e.g., using adder 842 of FIG. 8) during step 1070. Since the product of the first and second signals computed during step 1020 is '0', the result of the sum is the third signal. The configurable specialized processing block may store the sum to perform register pipelining of the first signal (e.g., using output registers 822 of FIG. 8) during step 1090. In order to implement a second register pipeline stage, the configurable specialized processing block may store the first, second, and third signals to perform register pipelining of the third signal (e.g., using input registers 812, 814, and 816 of FIG. 8) during step 1095.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs) just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using configurable specialized processing circuits that may operate as multiplexers and/or register pipelines is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A circuit operable in first and second modes, comprising:
   an output port;
   input ports that receive a plurality of signals;
   a multiplier that has a first input coupled to a subset of the input ports and that has a second input;
   configuration circuitry, wherein the configuration circuitry configures the circuit to perform an arithmetic function based on the plurality of signals and to provide the result of the arithmetic function at the output port during the first mode, and wherein the configuration circuitry further configures the circuit to perform a multiplexing function by routing a selected one of the plurality of signals to the output port during the second mode;
   a coefficient storage block that stores at least four constant values at four different individually selectable locations in the coefficient storage block; and
   a selection circuit coupled between the coefficient storage block and the multiplier, wherein the selection circuit has a first data input configured to receive a first of the at least four constant values, a second data input configured to receive a second of the at least four constant values, a third data input configured to receive a third of the at least four constant values, a fourth data input configured to receive a fourth of the at least four constant values, and a control input configured to receive a select signal with fewer bits than the total number of input ports of the circuit, and wherein only one of the at least four constant values is high while the remaining constant values are zero.

2. The circuit of claim 1, wherein the configuration circuitry further configures the circuit to serve as a register pipeline for a signal in the plurality of signals during a third mode.

3. The circuit of claim 2, further comprising:
   at least one register coupled between one of the input ports and the output port.

4. The circuit of claim 2, wherein the multiplier receives first and second signals in the plurality of signals from the subset of the input ports and performs at least a portion of the arithmetic function during the first mode and at least a portion of the multiplexing function during the second mode.

5. The circuit of claim 4, further comprising:
   an additional output port coupled to the multiplier.

6. The circuit of claim 4, further comprising:
   an additional multiplier that receives second and third signals from the input ports, wherein the additional multiplier performs an additional portion of the arithmetic function in the first mode and an additional portion of the multiplexing function in the second mode.

7. The circuit of claim 6, further comprising:
   an adder coupled to the multiplier and the additional multiplier, wherein the adder, the multiplier, and the additional multiplier collectively implement a sum of product function in the first mode and perform another additional portion of the multiplexing function in the second mode.

8. The circuit of claim 7, further comprising:
   bypass circuitry coupled between a given input port of the inputs ports and the adder, wherein the bypass circuitry selectively routes signals from the given input port to the adder to bypass the multiplier and the additional multiplier.

9. The circuit of claim 1, further comprising:
   an additional multiplier that has a first input coupled to another subset of the input ports and that has a second input;
   an additional coefficient storage block that stores additional constant values and that provides a selected one of the additional constant values to the second input of the additional multiplier;
   an additional selection circuit coupled between the additional coefficient storage block and the additional multiplier, wherein the additional selection circuit is configured to select from among the additional constant values to output to the additional multiplier, and wherein only one of the additional constant values is high while the remaining additional constant values are zero; and
   a summing circuit configured to receive signals from the multiplier and signals from the additional multiplier and to add the signals from the multiplier to the signals from the additional multiplier.

10. The circuit of claim 1, wherein the only one of the at least four constant values that is high is a logic one.

11. A method for operating a specialized processing block on an integrated circuit, comprising:
    receiving first, second, and third signals using input ports of the specialized processing block;
    with arithmetic circuitry, performing an arithmetic function based on the first, second, and third signals in a first mode;
    with the arithmetic circuitry, selecting between the first and second signals based on the third signal in a second mode, wherein selecting between the first and second signals based on the third signal comprises:
      with a first multiplier, multiplying the first signal by a logic one selected from a first storage block to output the first signal;
      with a second multiplier, multiplying the second signal by a logic zero selected from a second storage block to output a zero, wherein the output of the first multiplier and the output of the second multiplier are generated in parallel; and
      with a summing circuit, receiving the first signal output from the first multiplier at a first input of the summing circuit, receiving the zero output from the second multiplier at a second input of the summing circuit, and adding the received signals to output the first signal; and
    with registers, pipelining at least one of the first, second, and third signals in a third mode.

12. The method of claim 11, wherein performing the arithmetic function further comprises:
    with a multiplier, computing a product of the first and second signals.

13. The method of claim 11, further comprising:
    receiving fourth and fifth signals using the input ports of the specialized processing block; and
    with the arithmetic circuitry, selecting between the first, second, fourth, and fifth signals based on the third signal in the second mode, wherein selecting between the first, second, fourth, and fifth signals based on the third signal comprises:

with a third multiplier, multiplying the fourth signal by a logic zero selected from a third storage block to output zero;

with a fourth multiplier, multiplying the fifth signal by a logic zero selected from a fourth storage block to output a zero, wherein the output of the third multiplier and the output of the fourth multiplier are generated in parallel;

with a first additional summing circuit, receiving the zero output from the third multiplier at a first input of the first additional summing circuit, receiving the zero output from the fourth multiplier at a second input of the first additional summing circuit, and adding the received signals to output a zero; and with a second additional summing circuit, receiving the first signal output from the summing circuit and the zero output from the first additional summing circuit to output the first signal.

\* \* \* \* \*